United States Patent Office 2,773,778
Patented Dec. 11, 1956

2,773,778

ORGANIC FILM-FORMING PLASTIC CONTAINING 2,2′,4,4′ - TETRAHYDROXYBENZOPHENONE AS ULTRAVIOLET ABSORBENT

Paul E. Hoch and Robert W. Wynn, Easton, Pa., assignors to General Aniline & Film Corporation, New York, N. Y., a corporation of Delaware No Drawing. Application September 7, 1951,
Serial No. 245,642

4 Claims. (Cl. 106—187)

This invention relates to a composition of matter containing an organic-film forming plastic and 2,2′,4,4′- tetrahydroxybenzophenone from degradation and discoloration by exposure to ultraviolet light of the plastic.

There are a large number of organic compounds which possess the power to absorb light rays within the band of 2900 to 3700 A., and when uniformly distributed throughout a transparent plastic sheet, the resultant sheet acts as a filter for all the light rays passing through and will transmit only those waves which are not absorbed by the sheet and/or the absorbing agent. Thus, it is possible to screen out undesirable light rays and utilize the resulting filter in many technical and commercial applications, such as wrapping tissues for food products and the like.

Mono and polyhydroxybenzophenones such as 2,4′-dihydroxybenzophenone, 2,5-dihydroxybenzophenone, and the like, have been suggested as absorbents for ultraviolet light in various transparent plastic sheet materials and the stabilization of transparent plastics.

When 2,5-dihydroxybenzophenone is employed for the protection of polymeric vinylidene chloride products against darkening and embrittling effects of ultraviolet light, considerable discoloration of the product ensues.

We have discovered that 2,2′,4,4′-tetrahydroxybenzophenone is not only compatible with many organic materials or compositions which are water-white or substantially colorless such as film-forming plastics, resins, waxes and the like, but its efficiency at 400 m$\mu$ is about five to ten times that of the mono and polyhydroxybenzophenones heretofore suggested and employed.

Accordingly, it is the object of the present invention to provide an ultraviolet absorbing composition of matter comprising a light-transmitting carrier having uniformly dispersed therein 2,2′,4,4′-tetrahydroxybenzophenone as the selective ultraviolet absorbing agent.

Other objects and advantages will appear hereinafter.

The above objects are attained by incorporating into any organic water-white or substantially colorless light-transmitting carrier capable of fabrication into a film or foil an ultraviolet absorbing amount of 2,2′,4,4′-tetrahydroxybenzophenone. This compound, as pointed out above, is unique in that it exhibits unusual ultraviolet absorbing properties when incorporated into any light-transmitting carrier or composition without impairing the stability of the carrier or composition in which it is incorporated.

2,2′,4,4′-tetrahydroxybenzophenone is employed in a variety of carrier media which may comprise organic cellulose derivatives such as cellulose nitrate, cellulose acetate and other fatty acid esters of cellulose, such as cellulose propionate, cellulose butyrate, cellulose acetate-propionate, cellulose acetate-butyrate and the like, ethers of cellulose, such as ethyl ether, benzyl ether and the like, linear super polymers used for film elements as described in U. S. Patents 2,071,250, 2,071,252, 2,071,253 and 2,130,948, polvinyl resin film bases such as polyvinyl chloride, polyvinyl bromide, polyvinyl acetate, copolymers of vinyl chloride and vinyl acetate, copolymers of vinyl chloride and vinyl bromide, and mixtures of such polymers and copolymers.

The compound may also be employed in polymers of ethylene, styrene, and in lacquers or wax coatings and in transparent interlayer laminate of safety glass.

The proportions of 2,2′,4,4′-tetrahydroxybenzophenone which may be incorporated into the light-transmitting carrier are not critical and the actual or desired proportions depend upon the type of the material employed and particularly upon the thickness of the film or coating of the carrier media. Hence, actual proportions can be determined by simple routine tests. In general, we have found that for practical purposes an amount ranging from 0.1 to 10% by weight of the light carrier media may be employed to yield satisfactory ultraviolet absorption.

The following examples illustrate the employment of the preparation of a transparent plastic containing 2,2′,4,4′-tetrahydroxybenzophenone.

*Example I*

A cellulose acetate casting solution was prepared of the following composition:

| | Percent |
|---|---|
| Cellulose acetate (55% combined acetic acid) | 15.0 |
| Triphenyl phosphate | 3.7 |
| Methyl cellosolve | 28.6 |
| Absolute ethyl acetate | 38.21 |
| Absolute ethanol | 14.35 |

To the foregoing solution 0.36% of 2,2′,4,4′-tetrahydroxybenzophenone was added with stirring until solution was complete. The solution was then spread on a glass plate by means of a doctor blade whose opening was adjusted to produce the dry film with a thickness of 5 mils. The films were dried on the plate one day, stripped off, and hung in the air to dry for seven days. The optical density at various wave-lengths was measured with the Cary Spectrophotometer before exposure and after exposure to the light of the fadeometer for 60 and 200 hours. From the Cary curves, the transmission curves were plotted from which it was clearly evident that the efficiency of the compound at 400 m$\mu$ is about eight to twelve times stronger that of any dihydroxybenzophenone currently employed as an ultraviolet absorbent material.

*Example II*

A solution of monomeric styrene containing 0.3% to 0.5% of 2,2′,4,4′-tetrahydroxybenzophenone was polymerized by heating over two days at 100° C. and two days at 160° C. Discs molded from this material showed no noticeable yellowing after two days' exposure in a fadeometer. The unstabilized material yellowed.

*Example III*

Polyvinyl chloride plasticized with phthalate esters and containing 0.3 to 0.5% of 2,2′,4,4′-tetrahydroxybenzophenone showed extreme resistance to yellowing and increased brittleness when exposed to light from a fadeometer for many days.

The unusual and expected advantage of 2,2′,4,4′-tetrahydroxybenzophenone over closely related di and trihydroxybenzophenones is that films, foils and light carrier media containing the former absorbs very little of visible light and as a result does not distort the color balance of the colored object which is wrapped with a transparent film of foil containing the 2,2′,4,4′-tetrahydroxybenzophenone.

While we have disclosed the preferred embodiments of my invention, it will be readily appreciated that many changes and variations may be made therein without departing from the spirit theereof. Accordingly, the scope

We claim:

1. An ultraviolet absorbing composition of matter comprising a light-transmitting organic film-forming plastic carrier having uniformly dispersed therein 2,2′,4,4′-tetrahydroxybenzophenone.

2. An ultraviolet absorbing composition of matter comprising a sheet of polystyrene having uniformly dispersed therein, in ultraviolet absorbing amount, 2,2′,4,4′-tetrahydroxybenzophenone.

3. An ultraviolet absorbing composition of matter comprising a sheet of polyvinyl chloride having uniformly dispersed therein, in ultraviolet absorbing amount, 2,2′,4,4′-tetrahydroxybenzophenone.

4. An ultraviolet absorbing composition of matter comprising a sheet of cellulose acetate having uniformly dispersed therein, in ultraviolet absorbing amount, 2,2′,4,4′-tetrahydroxybenzophenone.

References Cited in the file of this patent

UNITED STATES PATENTS

| 1,941,710 | Moss | Jan. 2, 1934 |
| 1,989,683 | Comwell | Feb. 5, 1935 |
| 2,062,179 | Hunter | Nov. 24, 1936 |
| 2,264,291 | Boyer et al. | Dec. 2, 1941 |
| 2,528,338 | Cairns | Oct. 31, 1950 |
| 2,565,141 | Mark | Aug. 21, 1951 |
| 2,568,894 | Macleu | Sept. 25, 1951 |

OTHER REFERENCES

Meyer et al: "Ber-Dent. Chem. Ges" 32, 2103–4 (1899).

Abstract of application 763,146 of Meyer et al., published Aug. 1, 1950.